(12) United States Patent
Bulluck et al.

(10) Patent No.: US 7,919,189 B2
(45) Date of Patent: Apr. 5, 2011

(54) POLYSILAZANE COATINGS

(75) Inventors: John W. Bulluck, Spicewood, TX (US);
Brad A. Rix, Spicewood, TX (US)

(73) Assignee: Texas Research International, Inc., Austin, TX (US)

( * ) Notice: Subject to any disclaimer, the term of this patent is extended or adjusted under 35 U.S.C. 154(b) by 301 days.

(21) Appl. No.: 12/215,376

(22) Filed: Jun. 26, 2008

(65) Prior Publication Data

US 2009/0050737 A1 Feb. 26, 2009

(51) Int. Cl.
*B32B 15/08* (2006.01)

(52) U.S. Cl. ........ 428/447; 428/450; 524/407; 524/413; 524/430; 524/493; 524/588

(58) Field of Classification Search ........................ None
See application file for complete search history.

(56) References Cited

U.S. PATENT DOCUMENTS 6,756,126 B2 * 6/2004 Oguri et al. .................... 428/447
2006/0234579 A1 * 10/2006 Adam et al. .................. 442/136

* cited by examiner

*Primary Examiner* — Marc S Zimmer
(74) *Attorney, Agent, or Firm* — O'Keefe, Egan, Peterman & Enders, LLP

(57) ABSTRACT

A composition and process for manufacturing a camouflaged aircraft component. The process includes providing an aircraft component; applying an uncured coating onto the aircraft component wherein the uncured coating comprises polysilazane resin, at least one pigment, at least one matting agent, and at least one diluent; allowing the diluent to evaporate; curing the coating to provided a cured coating that comprises cured polysilazane, at least one pigment, and at least one matting agent.

20 Claims, No Drawings

POLYSILAZANE COATINGS

Subject to right of the assignee afforded under a Small Business Innovation Research (SBIR) program and SBIR Project AF04-127, the U.S. government has a paid-up license in this invention and the right in limited circumstances to require the patent owner to license others on reasonable terms as provided for by the terms of contract number FA8650-04-M-5006 which was supported by The United States Air Force Research Laboratory at Wright-Patterson Air Force Base.

BACKGROUND OF THE INVENTION

This invention pertains to coatings containing polysilazane, including camouflage coatings for aircraft.

In certain types of aircraft, especially certain military aircraft such as a C-17, the leading edge of titanium (or other metal) slats move perpendicular to the wing's front spar; hence, the gap between the slat and the pylon widens on extension. The flaps are externally blown by the engine efflux for extra lift. It is believed that many of the coating problems on the C-17 are due to the hot blasts of the reverse engine thrusts that thermally damage the current polyurethane camouflage coating on the titanium slats.

The inventors herein have determined that a need exists for thermally resistant, low gloss, camouflage coating, especially for the leading edge of aircraft slats. The inventors have also determined that a needs exists for a coating for aluminum heat shields on the C-130 aircraft or other coated aircraft areas subject to engine efflux.

SUMMARY OF THE INVENTION

This invention provides a solution to one or more of the problems and disadvantages discussed above.

In one broad respect, this invention is a camouflage composition, comprising: cured polysilazane, at least one pigment, and at least one matting agent.

In another broad respect, this invention is a process for making a camouflage composition, comprising: providing a formulation containing polysilazane resin, at least one pigment, at least one matting agent, and at least one diluent; allowing at least one diluent to evaporate; and curing the resin to form the polysilazane camouflage composition. In one embodiment, the curing is accomplished using moisture from air. In another embodiment, the curing is accomplished under a nitrogen atmosphere.

In another broad respect, this invention is a camouflaged aircraft component, comprising: an aircraft component having a coating thereon, wherein the coating comprises: cured polysilazane, at least one pigment, and at least one matting agent. In one embodiment, the component is a wing slat made of titanium.

In another broad respect, this invention is a process for manufacturing a camouflaged aircraft component, comprising: providing an aircraft component; applying an uncured coating onto the aircraft component wherein the uncured coating comprises polysilazane resin, at least one pigment, at least one matting agent, and at least one diluent; allowing the diluent to evaporate; curing the coating to provide a cured coating that comprises cured polysilazane, at least one pigment, and at least one matting agent. In one embodiment, the component is a wing slat made of titanium.

This invention provides a number of advantages. The coating is a single component, low viscosity liquid, easily spray applied, and dries in an hour per coating, with the coating completely reacted within 24 hours. In service, the jet blasts during reverse thrusting will have a postcure effect and generally result in property enhancement by further conversion of the polysilazane to silicon nitride or carbide ceramic. The coating to be sprayed is HAP free. In thermogravimetric analysis, some coating exhibited low weight losses such as 1.4% at 800 degrees Centigrade, thus demonstrating excellent high-temperature stability. When thermal cycling at 650 degrees Centigrade was conducted, very little color and gloss changes were noted and the resistance to diluents was excellent.

DETAILED DESCRIPTION OF THE INVENTION

The polysilazane resins used in this invention are generally of formula: $R-Si(NSi_2)_3$ where R is alkyl of from 1 to 6 carbons, or $-(-SiRR_2-NR_2-)_x-(-SiRR-NR_2-)_y-(SiRR-NR_3-)_z$ where R2 is hydrogen; x, y, and z are each independently from 1 to 10; and $R_3$ is $(C_xH_{2x})Si(OC_xH_{2x+1})$ especially $-CH_2CH_2CH_2-Si(OCH_2CH_3)$. Representative examples of such materials include Kion Corporations ML33/C33 and ML33/C12, which include polysilazane oligomers. Molecular weights of these oligomers range from about 700 to about 1,150 g/mol. These materials are low viscosity oligomer resins and the chains contain triethoxy silanes. Upon exposure to atmospheric moisture, the triethoxy silane converts to trisilanol that can condense to form a crosslinked polysilazane. Thus, curing can be accomplished in air at room temperature, though higher temperatures can be used to accelerate curing. Such polysilazane resins are described in U.S. Pat. Nos. 6,329,487 and 6,534,194, incorporated herein by reference in their entirety. Thus, in general, the silazanes and polysilazanes may be prepared by ammonolysis, the method comprising the following steps: a) introducing at least one halosilane having at least one Si—H bond into liquid anhydrous ammonia, the amount of liquid anhydrous ammonia being at least twice the stoichiometric amount of silicon-halide bonds on the halosilane, the halosilane reacting with the anhydrous liquid ammonia to form a precursor ammonolysis product and an ammonium halide salt or acid thereof, the ammonium halide salt or acid thereof being solubilized and ionized in the anhydrous liquid ammonia thereby providing an acidic environment; and b) maintaining the precursor ammonolysis product in the acidic environment for a sufficient time to reduce the number of Si—H bonds relative to the quantity of Si—H bonds that are incorporated into the novel silazane and/or polysilazane from the halosilane of step (a). The silazanes or polysilazanes prepared are characterized by repeating units of silicon-nitrogen comprising a reduced amount of Si—H bonds relative to the quantity of Si—H bonds that are incorporated into the silazane or polysilazane from Si—H bond containing starting compounds. Combinations of different silazane starting materials may be used.

The matting agents used in the practice of this invention typically can alter the surface of a coating in such a way that the light falling on it is scattered in a defined fashion. The matting agent particles stand out from the coating, invisible to the human eye. The color of the coating is not affected to any great extent. Representative examples of such matting agents include inorganic matting agents such as silica-based ACE-MATT matting agents from Degussa and silica-based matting agents available from Ineos Silicas. The matting agents may vary in size and include materials that are micron sized particles. For example, the particles may have an average diameter of from about 0.1 to 1000 microns, and in one embodiment from 0.1 to 100 microns. Combinations of matting agents may be used.

The pigments used in the practice of this invention may be of any color or combination of colors, as well as employed in any pattern or combination of patterns. The pigments used herein are typically inorganic materials. Inorganic pigments can be crystals of metal oxides. This structure is extremely stable, and sets it apart from organic pigments, which are generally composed of carbon, oxygen, and nitrogen. Such pigments include mixed metal oxides that include more than one type of metal atom along with the oxygen to make the pigment. In general, pigments are produced by the high temperature calcination of high grade metal oxides in a kiln according to given time and temperature profiles. The resulting mixed metal oxide can be milled using a variety of high-energy techniques in order to reduce the particle size. The pigments used herein are typically stable at high temperatures. Representative examples of such pigments include black and gray inorganic pigments, such as the camouflage inorganic pigment packages from Shepherd Color. The camouflage pigment CM2581 available from Shepherd Color contains a mixture of chromic oxide (2-8%), copper chromite black spinel (20-30%), titanium dioxide (50-70%), zinc iron chromate black spinel (10-15%). Combinations of pigments may be used.

The diluents that are used in the practice of this invention include any diluents that do not react with the polysilazane resin or other components of the formulations of this invention, and which facilitate adequate formation of sprayable formulations. Such diluents include aprotic diluents, especially aprotic diluents that are HAP compliant. Representative examples of such diluents include but are not limited to certain chlorinated hydrocarbons, certain fluorinated hydrocarbons, certain fluorochlorohydrocarbons, including but not limited to para-chlorobenzotrifluoride. Additionally, diluents such as butyl and pentyl propionate have been found especially useful as diluents. A wide variety of aromatic and aliphatic ketones and esters can also be useful as diluents. Combinations of diluents may be used.

Apply by coating, spraying, brushing, and the like. In one embodiment, the formulation is made for spraying. The resulting coating, when cured, may be of a variety of thicknesses, typically in the range from 0.0025 cm to 0.05 cm, though typically less than 0.025 cm.

The amounts of the components of the uncured coating of this invention are typically 10 to 25 percent by weight of polysilazane resin, 35 to 75 percent by weight of pigment and 0.3 to 10% matting agent, and 10 to 50 percent by weight of diluent, with all percentages adding up to 100 percent. In one embodiment, the amounts of the components of the uncured coating of this invention are 10 to 25 percent by weight of polysilazane resin, 55 to 65 percent by weight of pigment and 1 to 5% matting agent, and 10 to 40 percent by weight of diluent, with all percentages adding up to 100 percent. If the composition includes additional materials other than polysilazane resin, pigment and matting agent, and diluent, the composition overall percentages may change though the relative percentages of polysilazane resin, pigment and matting agent, and diluent will remain as indicated above.

The type of substrates and surfaces on which the coating of this invention may be used vary widely. For example, the type of surfaces that can be treated with the adhesives of this invention includes glass, ceramics, metals, and plastics. A particularly advantageous use of this coating is as a coating on aircraft components exposed to high temperatures including exterior aircraft surfaces such as a wing slat made of titanium. Similarly, the coating of this invention can be used on aluminum heat shields on the C-130 aircraft or other coated aircraft areas subject to engine efflux Other materials may be included in the composition of this invention, including but not limited to flow and leveling agents such as available from BYK, hydrophobic fumed silica such as available from Degussa, alumina fibers such as available from Aldrich, silicon carbide fibers such as available from Aldrich, and the like. If used, such materials will be used in amounts of from 0.01 to about 10 percent of the formulations prior to evaporation of the diluent.

The following examples are provided as being illustrative of the invention, and are not to be construed as limiting the scope of the invention or claims hereto. Unless otherwise denoted, all percentages are by weight.

A number of polysilazane coatings were prepared and tested. For each run, the coating was formed from a composition containing (1) a diluent (Oxsol 100, para-chlorobenzotrifluoride), (2) a matting agent (obtained from Gasil or Acematt matting agent from Degussa) and a camouflage inorganic pigment package from Shepherd Color, and (3) liquid polysilazane resin. The formulations were prepared using a Union Process Attritor, which is a grinding mill containing internally agitated media (zirconia oxide). The coatings and the results are shown in the following table. In each run, the polysilazane was Kion Corporations's ML33/C12 polysilazane, which is includes triethoxy silane groups and is a low viscosity oligomer. Upon exposure to atmospheric moisture, the triethoxy silane group converts to trisilanol that can condense to form crosslinked polysilazane. The curing was conducted using room temperature moisture condensation. After diluent evaporation, the matrix coatings contain between 50% and 76% pigment concentration.

| Run | Polysilazane Wt. % | Pigment and matting agent Wt. % | Diluent Wt. % | Thermal Stability at 800 C. TGA Wt. Loss | Temp delta hot plate | Thermal Cycling - Adhesion (psi) | Gloss 85 |
|---|---|---|---|---|---|---|---|
| 1 | 16 | 41 | 43 | 2.7 | 298 | 2080 | 0.4 |
| 2 | 20 | 49 | 31 | 2.3 | 323 | 2040 | 0.3 |
| 3 | 16.9 | 44.6 | 38.5 | 2.6 | 354.9 | 1720 | 0.4 |
| 4 | 18 | 60 | 22 | 1.8 | 337.8 | 1280 | 0.6 |
| 5 | 20 | 40 | 40 | 2.8 | 441 | 1920 | 0.2 |
| 6 | 16.9 | 55.1 | 28 | 1.7 | 399 | 1120 | 0.4 |
| 7 | 16 | 41 | 43 | 2.7 | 401.3 | 1840 | 0.3 |
| 8 | 17.8 | 48.2 | 34 | 2.4 | 484.6 | 1440 | 0.4 |
| 9 | 16 | 62 | 22 | 1.5 | 317.3 | 640 | 0.3 |
| 10 | 16 | 62 | 22 | 1.5 | 317.3 | 720 | 0.3 |
| 11 | 20 | 40 | 40 | 2.6 | 401.8 | 960 | 1.5 |
| 12 | 16 | 51.5 | 32.5 | 2.1 | 417.9 | 720 | 0.3 |
| 13 | 20 | 58 | 22 | 1.4 | 378.7 | 880 | 0.3 |
| 14 | 20 | 58 | 22 | 1.3 | 398.2 | 960 | 0.4 |

| Run | Gloss 60 | Pull-off adhesion (ASTM D4541) (psi) | Immersion Mil-H-83282 | Immersion Mil-H-5606 | Immersion Mil-23699 | Jet Reference | Sprayability |
|---|---|---|---|---|---|---|---|
| 1 | 0.7 | 880 | 8 | 7 | 9 | 9 | 8 |
| 2 | 0.3 | 1200 | 8 | 6 | 5 | 6 | 8 |
| 3 | 0.3 | 760 | 6 | 8 | 7 | 8 | 7 |
| 4 | 0.9 | 1100 | 5 | 5 | 7 | 5 | 6 |
| 5 | 0.5 | 920 | 6 | 10 | 9 | 8 | 9 |
| 6 | 0.3 | 480 | 5 | 10 | 10 | 8 | 8 |
| 7 | 0.8 | 800 | 6 | 5 | 7 | 7 | 8 |
| 8 | 0.4 | 1040 | 9 | 7 | 6 | 8 | 7 |
| 9 | 0.2 | 1600 | 8 | 6 | 5 | 7 | 7 |

-continued

| Run | Gloss 60 | Pull-off adhesion (ASTM D4541) (psi) | Immersion Mil-H-83282 | Immersion Mil-H-5606 | Immersion Mil-23699 | Jet Reference | Sprayability |
|---|---|---|---|---|---|---|---|
| 10 | 0.2 | 1600 | 8 | 6 | 6 | 7 | 7 |
| 11 | 1.2 | 1520 | 6 | 9 | 8 | 6 | 7 |
| 12 | 0.3 | 1920 | 8 | 8 | 9 | 7 | 6 |
| 13 | 0.3 | 1520 | 6 | 5 | 8 | 7 | 6 |
| 14 | 0.3 | 1200 | 5 | 6 | 7 | 6 | 7 |

The 14 runs sprayed well with low-pressure commercial spray gun equipment. For numeric ratings of 1 to 10, 10 is the best value. The thermal stability tests were performed using a thermal shock chamber, where the test panels were cycled from −50C for 16 hours to 50C for 8 hours, for 72 hours. The fluid resistance tests were performed according to MIL-PRF-85285D, which generally involves immersing samples in hydraulic fluids and lubricating oil for 24 hours at elevated temperatures. Four hours after removal, specimens were examined visually and at 200× for blistering, softening, or other types of degradation. Highly pigmented coatings appeared virtually unaffected under magnification, while lower pigment valued samples exhibited slight blistering. The specular gloss measurements were taken with a BYK-Gardner micro-TRI-gloss meter. Mil-PRF-85285C permits that a maximum of 9 for camouflage colors at an 85 degree angle of incidence and a maximum of 5 for a 60 degree angle of incidence. Except for run 6, all formulations were below these limits. The thermogravimetric analyses were conducted on coatings cured at room temperature and humidity for five days prior to the analysis. Good correlation with the weight loss for the polysilazane and the percentage of filler and binder were observed.

The formulation of Run 10 was sprayed on titanium then exposed to a propane torch for 1 minute. As son as the torch was removed, the samples were then fully immersed in water. The standard Mil-PRF-85285 polyurethane coating was completely discolored, but run 10 showed no evidence of being exposed. Extensive darkening of the standard coating was evident.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A camouflaged aircraft component, comprising: an aircraft component having a coating thereon, wherein the coating comprises: cured polysilazane, at least one pigment, and at least one matting agent.

2. The component of claim 1, wherein the component is a wing slat made of titanium.

3. The component of claim 1 wherein the at least one matting is an inorganic silica-based matting agent.

4. The component of claim 1 wherein the matting agent has an average diameter of from about 0.1 to 1000 microns.

5. The component of claim 1 wherein the at least one pigment is a black inorganic pigment, a gray inorganic pigment, or a combination thereof.

6. The component of claim 1 wherein the composition is in the form of a coating having a thickness in the range from 0.0025 cm to 0.05 cm.

7. A process for manufacturing a camouflaged aircraft component, comprising:
   providing an aircraft component;
   applying an uncured coating onto the aircraft component wherein the uncured coating comprises polysilazene resin, at least one pigment, at least one matting agent, and at least one diluent;
   allowing the diluent to evaporate;
   curing the coating to provided a cured coating that comprises cured polysilazane, at least one pigment, and at least one matting agent.

8. The process of claim 7, wherein the component is a wing slat made of titanium.

9. The component of claim 1 wherein the cured polysilazane is made from a silazane of formula: —(SiRR$_2$—NR$_2$—)x-(—SiRR—NR$_2$—)$_y$(SiRR—NR$_3$—)$_z$ where R is alkyl of from 1 to 6 carbons, R$_2$ is hydrogen, x, y, and z are each independently from 1 to 10; and R$_3$ is (C$_x$H$_{2x}$)Si(OC$_x$H$_{2x+1}$)$_3$.

10. The component of claim 9 where the silazane is an oligomer of a molecular weight in the range from about 700 to about 1,150 g/mol.

11. The process of claim 7, wherein the curing is accomplished using moisture from air.

12. The process of claim 7, wherein the curing is accomplished under a nitrogen atmosphere.

13. The process of claim 7 wherein the diluent is a chlorinated hydrocarbon, a fluorinated hydrocarbon, a fluorochlorohydrocarbon, butyl propionate, pentyl propionate, an aliphatic ketone, an aliphatic ester, or a combination thereof.

14. The process of claim 7 wherein the amounts of each component of the uncured coating is from 10 to 25 percent by weight of polysilazane resin, 35 to 75 percent by weight of pigment and 0.3 to 10% matting agent, and 10 to 50 percent by weight of diluent, with all percentages adding up to 100 percent.

15. The process of claim 7 wherein the polysilazane is of the formula: (SiRR$_2$—NR$_2$—)x-(SiRR—NR$_2$—)$_y$(SiRR—NR$_3$—)$_z$ where R is alkyl of from 1 to 6 carbons, R$_2$ is hydrogen, x, y, and z are each independently from 1 to 10; and R$_3$ is (C$_x$H$_{2x}$)Si(OC$_x$H$_{2x+1}$)$_3$.

16. The process of claim 7 where the polysilazane resin is an oligomer of a molecular weight in the range from about 700 to about 1,150 g/mol.

17. The process of claim 7 wherein the at least one matting agent is an inorganic silica-based matting agent.

18. The process of claim 7 wherein the matting agent has an average diameter of from about 0.1 to 1000 microns.

19. The process of claim 7 wherein the at feast one pigment is a black inorganic pigment, a gray inorganic pigment, or a combination thereof.

20. The process of claim 7, wherein the polysilazane camouflage composition is in the form of a coating having a thickness in the range from 0.0025 cm to 0.05 cm.

* * * * *

UNITED STATES PATENT AND TRADEMARK OFFICE
CERTIFICATE OF CORRECTION

| | | |
|---|---|---|
| PATENT NO. | : 7,919,189 B2 | Page 1 of 1 |
| APPLICATION NO. | : 12/215376 | |
| DATED | : April 5, 2011 | |
| INVENTOR(S) | : Bulluck et al. | |

It is certified that error appears in the above-identified patent and that said Letters Patent is hereby corrected as shown below:

In claim 19, column 6, line 56, delete "feast" and insert -- least --.

Signed and Sealed this
Twenty-fourth Day of May, 2011

David J. Kappos
*Director of the United States Patent and Trademark Office*